Patented Feb. 6, 1940

2,189,717

UNITED STATES PATENT OFFICE 2,189,717

VULCANIZATION OF RUBBER

Winfield Scott, Akron, Ohio, assignor to Wingfoot Corporation, Wilmington, Del., a corporation of Delaware No Drawing. Application April 8, 1936, Serial No. 73,343

9 Claims. (Cl. 260—792)

This invention relates to the vulcanization of rubber and, more particularly, to a new class of accelerators of rubber vulcanization.

Heretofore various chemical compounds have been found to be rubber vulcanization accelerators. Among these are the mercaptothiazoles, the dithiocarbamates, certain guanidines and the accelerating aldehyde amines. Some of these known accelerators have a very active accelerating action and are called semi-ultra or ultra accelerators. Others are less active and are commonly referred to as normal or weak accelerators.

This invention involves the discovery that compounds containing a quinoline nucleus in which a sulphide grouping is substituted are excellent accelerators of vulcanization. Exemplary are mercapto quinoline, the alkyl, alkoxy, amino and hydroxy substituted mercapto quinolines, and the metal salts and mono- and di-sulphides thereof. Of the compounds of the invention, those in which the sulphide group is substituted in the quinoline nucleus at the two position are preferred.

Illustrative of some of the compounds of the invention is the formula

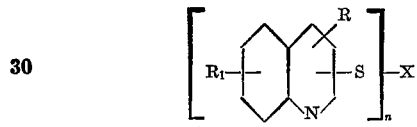

wherein R and R₁ are hydrogen, alkyl, alkoxy, chlor, thialkyl, amino, alkylamino, arylamino, nitro, hydroxy or mercapto radicals, n is one, two or three, and X is a radical such as hydrogen, a metal, a quinolyl radical or a thio quinolyl radical. Generally n will be one except where X is a bi- or tri-valent metal. X may also represent various other radicals such as benzothiazyl, methylol, thiocarbamyl, aromatic acyl, dinitro aryl, thiofuroyl and thiobenzoyl radicals. While various definitions of R and R₁ have been described, it will be understood that those compounds are preferred wherein R and R₁ are hydrogen or methyl radicals.

The mercapto quinolines themselves have been known heretofore and may be prepared, as described in Berichte, volume 62, page 2730, or by fusing hydroxy quinoline with phosphorus penta sulphide. Thus, from carbostyryl one obtains 2-mercapto quinoline. Also, by heating the desired chlor quinoline in a suitable solvent with potassium hydrosulphide at a temperature of about 150° C., mercapto quinolines are obtained (see Berichte, volume 32, page 1305).

The quinolyl sulphides containing radicals other than hydrogen attached to the sulphur atom are in general readily prepared. Such metal salts as the alkali metal salts are prepared by reacting the mercapto quinoline with an aqueous solution of an alkali metal hydroxide. The bivalent metal salts are prepared by adding an aqueous solution of a soluble salt of the desired metal to a dilute alcoholic solution of the sodium salt of the desired mercapto quinoline. For example, the zinc salt of 2-mercapto lepidine is prepared by adding an aqueous solution of zinc acetate to a dilute alcoholic solution of sodium lepidyl sulphide. The disulphides may be prepared by oxidizing either the mercapto quinolines themselves or alkali metal salts thereof with an oxidizing agent such as ammonium persulphate. The diquinolyl mono sulphides may be prepared by reacting an alcoholic solution of a sodium salt of a mercapto quinoline with a chlor quinoline; e. g., 2-lepidyl-2'-quinolyl mono sulphide is prepared by reacting an alcoholic solution of the sodium salt of alpha mercapto lepidine with alpha chlor quinoline.

Illustrative compounds of the invention are the following: 2-mercapto quinoline, di(2-quinolyl) disulphide, di(2-quinolyl) mono sulphide, 2-mercapto lepidine, the di(2-lepidyl) mono- and disulphides, 2-mercapto 4-8-dimethyl quinoline and the corresponding mono- and di-sulphides, zinc quinolyl sulphide, zinc lepidyl sulphide, the zinc salt of 2-mercapto 4-8-dimethyl quinoline and the lead, calcium, barium, magnesium, aluminum, cadmium and mercury salts of 2-mercapto lepidine and 2-mercapto quinoline. Others are 4-mercapto quinaldine, the cyclohexyl amine addition products of the zinc salts of 2-mercapto lepidine and 2-mercapto quinoline, which may be prepared by adding one mol of cyclohexyl amine to an aqueous suspension of a molar proportion of the zinc salt of 2-mercapto lepidine or of the 2-mercapto quinoline. Other illustrative compounds are the piperidine-, amylamine-, butylamine-, diethylamine-, dibutylamine-, ethylene diamine-, benzyl amine-, and tetrahydro furfurylamine addition products of the zinc salt of 2-mercapto lepidine and of the zinc salt of 2-mercapto quinoline.

Still others are the alkoxy mercapto quinolines, such as 2-mercapto 6-methoxy quinoline and 2-mercapto 6-ethoxy lepidine; the amino mercapto quinolines, such as 2-mercapto 6-amino lepidine and 2-mercapto 7-amino quinoline;

the thialkyl mercapto quinolines such as 2-mercapto 6-thio methyl lepidine, 2-mercapto 8-thio butyl lepidine, and 2-mercapto 7-thio ethyl quinoline; the alkyl- and aryl-amino mercapto quinolines, such as 2-mercapto 6-dimethyl amino lepidine, 2-mercapto 6-phenyl amino quinoline, 2-mercapto 7-butyl amino quinoline and 2-mercapto 6-p-tolyl amino lepidine; the hydroxy mercapto quinolines, such as 2-mercapto 6-hydroxy quinoline, 2-mercapto 6-hydroxy lepidine and 2-mercapto 8-hydroxy quinoline; the nitro mercapto quinolines, such as 2-mercapto 6-nitro quinoline and 2-mercapto 6-nitro lepidine; the poly mercapto quinolines, such as 2-8-dimercapto quinoline, 2-4-dimercapto quinoline and 2-6-dimercapto lepidine; the aromatic mercapto quinolines, such as 2-mercapto 6-phenyl quinoline, 2-mercapto 6-phenyl lepidine, 2-mercapto 6-tolyl lepidine, 2-mercapto 6-phenetidyl quinoline; and the chlor mercapto quinolines, such as 2-mercapto 6-chlor quinoline and 2-mercapto 8-chlor lepidine.

Other compounds of the invention containing a quinoline nucleus in which a sulphide grouping is substituted are quinolyl aromatic thiazyl mono sulphides prepared by reacting an alkali metal salt of a mercapto quinoline with a 1-chlor aromatic thiazole, or by reacting an alkaline mercapto aryl thiazole with a chlor quinoline, such as 2-quinolyl 1'-benzothiazyl sulphide, 2-lepidyl 5'-nitro 1'-benzothiazyl sulphide and 6-ethoxy 2-quinolyl 5'-nitro 1'-benzothiazyl sulphide; aldehyde derivatives of mercapto quinolines, such as the formaldehyde reaction product of 2-mercapto quinoline, which is prepared by dissolving 2-mercapto quinoline in ethanol in the presence of an acid, such as hydrochloric acid, adding formaldehyde thereto, and precipitating the product with water; quinolyl esters of dithiocarbamic and other dithio acids prepared by reacting a 2-chlor quinoline with an alkali metal salt of the dithio acid, such as the 2-quinolyl and 2-lepidyl esters of dithiocarbamic acids as of dimethyl-, dibutyl-, diethyl-, pentamethylene-, ditetrahydro alpha furfuryl-, N-ethyl cyclohexyl-, dicyclohexyl- and N-butyl tetrahydro alpha furfuryl dithiocarbamic acids, the 2-quinolyl and 2-lepidyl esters of dithiofuroic acid, and the 2-quinolyl and 2-lepidyl esters of dithiobenzoic acid; the aromatic acyl quinolyl sulphides, such as benzoyl- and phthaloyl 2-quinolyl sulphides, prepared by reacting the acyl halide with sodium quinolyl mercaptide in solution; and the nitro aryl quinolyl sulphides, such as 2'-4' dinitro phenyl 2-quinolyl sulphide, which may be prepared by reacting 2-4-dinitro chlor benzene with sodium quinolyl mercaptide in solution, and 2'-4'-dinitro 6'-chloro phenyl 2-quinolyl sulphide.

In the case of the 2-mercapto quinolines, it is possible to add the reactants which produce them directly to the rubber, permitting the reaction to take place during the heat incident to vulcanization. Thus, an equimolar mixture of 2-chlor lepidine and thio urea, the reaction product of which is 2-mercapto lepidine, may be added directly to the rubber instead of adding the performed 2-mercapto lepidine. Mixtures of thio urea with other 2-chlor quinolines, such as 2-chlor quinoline itself, 2-chlor 4-8-dimethyl quinoline, etc., may also be incorporated similarly in rubber.

The compounds of the invention may be employed in substantially any of the usual rubber formulae. Illustrative of one formula in which the compounds of the invention have been found to be excellent accelerators is the following:

|  | Parts by weight |
|---|---|
| Smoked sheet rubber | 100 |
| Zinc oxide | 5 |
| Sulphur | 3 |
| Accelerator | As indicated |

Various accelerators of the invention were incorporated into separate portions of a rubber stock corresponding to the above formula and vulcanized for varying periods of time. In the following table are given for several illustrative stocks the tensile and elongation properties at the cure which was indicated by hand tests to be the best or optimum cure.

| Material | Amt. by weight | Cure in mins. at °F. | Ult. tens. kgs./cm². | Max. elg., percent | Modulus kgs./cm.² at— | |
|---|---|---|---|---|---|---|
|  |  |  |  |  | 500% | 700% |
| 1 | .50 | 10@240° | 202 | 680 | 57 | |
| 2 | .20 | 30@260° | 163 | 790 | 25 | 97 |
| 3 | .50 | 30@260° | 140 | 780 | 25 | 89 |
| 4 | .50 | 30@260° | 124 | 780 | 23 | 79 |
| 5 | .20 | 30@260° | 152 | 810 | 22 | 78 |
| 6 | .50 | 40@260° | 128 | 810 | 18 | 65 |
| 7 | .50 | 50@285° | 80 | 830 | 13 | 38 |
| 8 | .50 | 30@260° | 123 | 780 | 23 | 77 |
| 9 | .50 | 30@260° | 160 | 750 | 32 | 118 |
| (10 DPG neutral phthalate) | .50 / .20 | 80@260° | 126 | 790 | 21 | 69 |
| 11 | .50 | 30@260° | 143 | 760 | 26 | 97 |
| 12 | .50 | 30@260° | 138 | 720 | 33 | 124 |
| (13 DPG) | .50 / .20 | 30@260° | 115 | 810 |  | 61 |
| 14 | .50 | 60@285° | 44 | 810 |  | 23 |

The accelerators employed in the various stocks for which data is given above are identified as follows:

1. 2-mercapto quinoline
2. Di(2-quinolyl) disulphide
3. 2-mercapto 4-8-dimethyl quinoline
4. 2-mercapto lepidine
5. Di(2-lepidyl) disulphide
6. Di(4-8-dimethyl 2-quinolyl) disulphide
7. 4-mercapto quinaldine
8. Zinc lepidyl sulphide
9. Lead lepidyl sulphide
10. Cadmium lepidyl sulphide DPG Diphenylguanidine 11. Mercuric lepidyl sulphide
12. Cyclohexylamine add. product of zinc lepidyl sulphide
13. Mixture of 2-chlor lepidine and thio urea
14. Mixture of 2-chlor lepidine and thio urea From the above data it will be noted that the 2-mercapto quinolines and derivatives thereof are very active accelerators and are more powerful than the 4-mercapto compounds. It will be noted further that the compounds may be employed with basic accelerators of another type such as diphenylguanidine, diortho tolyl guanidine, diphenylguanidine acid- and neutral oxalate, and diphenylguanidine neutral phthalate. Other such basic nitrogen accelerators are ammonia, the amyl primary and secondary amines, urea, 2-4-diamino diphenylamine, piperidine, cyclohexylamine, benzylamine, N-ethyl cyclohexylamine, tetrahydro furfuryl amine, n-butyl amine, urea succinate, p-p' diamino diphenyl methane, diethyl amine, heptyl amine, di isopropylamine, etc. A mixture of 2-chlor lepidine and thio urea is not a very strong accelerator by itself but when employed with a basic nitrogen accelerator, such as diphenylguanidine, it shows very active accelerating properties. It will be apparent that a valuable class of accelerators is provided by this invention.

It will be understood that the examples presented herein are but illustrative and not limitative of the invention. Other substituents in the quinoline nucleus than methyl groups may be present, illustrative of which are the ethyl, propyl and butyl groups, as well as those previously described, and others. Similarly, other metal salts than those specifically described may be used as accelerators. Thus, the sodium and potassium salts of the 2-mercapto quinolines are valuable latex accelerators. Where pre-coagulated rubber rather than latex is used, the bivalent metal salts and, of these, the zinc salt in particular, will generally be preferred over the alkali metal salts.

It is intended that the patent shall cover, by suitable expression in the appended claims, all features of patentable novelty inherent in the invention.

What I claim is:

1. The process of accelerating the vulcanization of rubber which comprises vulcanizing in the presence of 2-mercapto quinoline.

2. The process of accelerating the vulcanization of rubber which comprises vulcanizing in the presence of a 2-mercapto quinoline.

3. The process of accelerating the vulcanization of rubber which comprises vulcanizing in the presence of a mercapto quinoline.

4. The process of accelerating the vulcanization of rubber which comprises vulcanizing in the presence of a mercapto quinoline having a methyl substituent in the nucleus.

5. The process of accelerating the vulcanization of rubber which comprises vulcanizing in the presence of a mercapto quinoline having from zero to two nucleus hydrogen atoms replaced by methyl groups.

6. The vulcanizates prepared by vulcanizing rubber in the presence of a 2-mercapto quinoline.

7. The vulcanizates prepared by vulcanizing rubber in the presence of a mercapto quinoline.

8. The vulcanizates prepared by vulcanizing rubber in the presence of a mercapto quinoline having a methyl substituent in the nucleus.

9. The vulcanizates prepared by vulcanizing rubber in the presence of a mercapto quinoline having from 0 to 2 nucleus hydrogen atoms replaced by methyl groups.

WINFIELD SCOTT.

DISCLAIMER 2,189,717.—*Winfield Scott*, Akron, Ohio. VULCANIZATION OF RUBBER. Patent dated February 6, 1940. Disclaimer filed November 27, 1940, by the assignee, *Wingfoot Corporation*.

Hereby enters this disclaimer to claims 2 to 9 inclusive.

[*Official Gazette December 24, 1940.*]